F. RAISBECK.
MANURE SPREADER.
APPLICATION FILED OCT. 24, 1914.
1,199,417.
Patented Sept. 26, 1916.
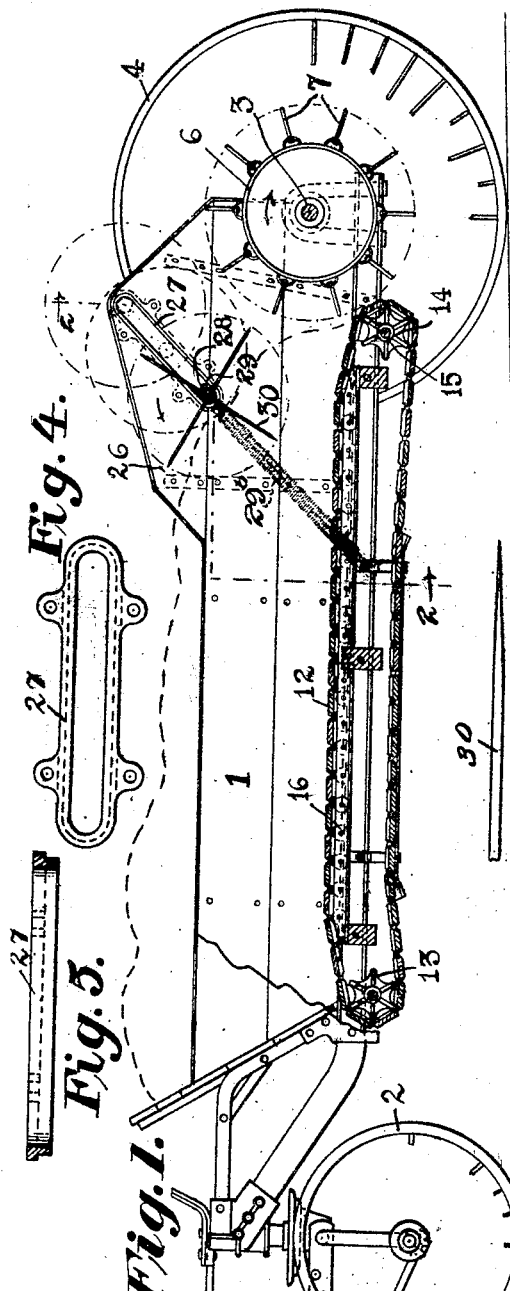

UNITED STATES PATENT OFFICE.

FRANK RAISBECK, OF BLOOMINGTON, ILLINOIS, ASSIGNOR TO MARSEILLES COMPANY, OF EAST MOLINE, ILLINOIS, A CORPORATION OF ILLINOIS.

MANURE-SPREADER.

1,199,417.

Specification of Letters Patent.

Patented Sept. 26, 1916.

Application filed October 24, 1914. Serial No. 868,413.

*To all whom it may concern:*

Be it known that I, FRANK RAISBECK, a citizen of the United States, residing at Bloomington, in the county of McLean and State of Illinois, have invented certain new and useful Improvements in Manure-Spreaders, of which the following is a specification, reference being had therein to the accompanying drawing.

The invention relates especially to spreaders of the class in which each is provided with a beater adapted to rotate rapidly about a transverse axis and with a movable bottom adapted to support the manure and feed it slowly backward to be engaged and distributed by the beater.

The object of the invention is to provide in such a spreader and in combination with the beater and the movable bottom a rake device of improved form and mounting adapted to engage the load at points adjacent the beater and to regulate its movement and the distributing action of the beater.

In the drawings I have shown a beater mounted concentrically with the main axle of the spreader, but it will be understood that so far as certain features of the invention are concerned there can be variation in this respect. And it will be further understood that as concerns the detailed construction of the movable bottom, and the driving mechanism therefor, and of the various other parts there can be considerable variation and modification according to the wishes of the designer.

In the accompanying drawings: Figure 1 is a longitudinal vertical sectional view through a spreader embodying my invention. Fig. 2 is a transverse vertical sectional view taken along the line 2—2 of Fig. 1. In this view the beater with its driving mechanism and the driving mechanism for the movable bottom are omitted for the sake of simplicity. Fig. 3 is a diagrammatic rear view partly in section showing the relationship of the rotary rake to the load. Figs. 4 and 5 are detailed views of one of the guide devices for the rake. Fig. 6 is a fragmentary side view showing one form of driving mechanism for the movable bottom. Fig. 7 is a fragmentary view partly in section of the driving mechanism for the beater. Fig. 8 is a transverse sectional view of the driving mechanism. Fig. 9 is a detail view of one of the fingers of the rake.

Referring to the drawings, 1 represents the body of the spreader supported at its front end upon the dirigible wheels 2 and at its rear end upon the axle 3 which in turn is supported on the ground wheels 4, 4. Interposed between each ground wheel 4 and the axle there is provided an automatic backing ratchet 5 of the usual sort.

6 represents the rotary beater which is shown as mounted directly upon the axle 3. The beater is provided with a large number of radial fingers 7, 7. For imparting motion to the beater any suitable form of mechanism can be used. For purposes of illustration I have shown a disk 8 secured to the axle 3 and provided with a cylindrical flange having inward projecting gear teeth. Loosely mounted on the axle 3, but fixedly connected to the beater is a sleeve 9 having a series of outward projecting gear teeth. 10 is a casing freely mounted for rotation on the axle and carrying three pairs of fixedly connected pinions, one pinion of each pair meshing with the teeth on the disk 8 and the other meshing with the teeth on the sleeve 9. By means of a lever 11 engaging a lug on the casing 10, the casing can be held against rotation and when it is so held power will be transmitted from the axle through the gear teeth and the pinions to drive the beater. When the lever 11 is moved to disengage the lug, the casing 10 is permitted to freely rotate, and the beater is permitted to stop its rotation.

12 represents the movable bottom for the body and it can be constructed and supported in any usual or preferred way. As shown it is of the endless type and passes over idler sprockets 13 at the front and over sprockets 14 at the rear mounted on the transverse shaft 15. The upper strand of the bottom is preferably supported by means of a series of rollers 16. For driving the bottom any suitable mechanism can be provided, but for purposes of illustration I have shown an eccentric 17 mounted on the axle 3 and a ratchet wheel 18 mounted on the shaft 15 and connected therewith.

19 and 20 are arms independently mounted to oscillate about the axis of the shaft 15. The arms are provided respectively with spring pressed pawls 21 and 22 engaging the ratchet wheel 18.

23 is an eccentric strap engaging the eccentric 17. Links 24 and 25 connect the strap 23 with the two arms 19 and 20 respectively. The result is that when the eccentric 17 is turned the two arms 19 and 20 are oscillated in opposite directions so that one pawl is engaging the ratchet wheel to turn it while the other is being retracted. In this way the movable bottom is given a substantially continuous, but relatively slow, movement to feed the load backward toward the beater.

22$^a$ is a pawl support mounted to oscillate about the shaft 15. It can be controlled by means of a link 22$^b$. This support 22$^a$ can be adjusted to hold the pawls out of engagement with the ratchet wheel 18 and thus break the power connection between the axle and the movable bottom.

The sides of the body 1 are preferably extended upward near the rear, as indicated at 26, 26. Formed in these extensions 26, 26 are slots inclined upward and backward at such an angle that lines perpendicular to their axes approximately at the center will intersect the axis of the beater. In other words the axis of the slots are tangent to a cylindrical surface concentric with the beater. In each slot there is mounted a suitable guide member 27 which can be advantageously formed, as shown in detail in Figs. 4 and 5. Extending transversely across the body is a shaft 28. The ends of this shaft project respectively through the two slots at 27 and serve as trunnions. At each end of the shaft there is provided a collar 29 adapted to engage the outer sides of the members 27 and prevent any considerable longitudinal movement of the shaft. The collar 29, which is loosely mounted on the shaft, may be held in place by means of a nut or washer 29$^a$. Preferably, though as concerns certain features of the invention not necessarily, springs 29$^b$ are connected, respectively, to the collars 29 and serve to press the shaft 28 toward the lower ends of the slots. Connected with the shaft 28 are series of fingers 30 projecting radially therefrom. As shown there are four series of fingers, each series extending substantially from one side of the body to the other; but it will be understood that as concerns the exact number and arrangement of fingers there can be variation so far as features of the invention are concerned. Preferably the fingers 30 are tapered for a considerable distance back from the points, as indicated in Fig. 9.

From the foregoing description the operation of the spreader will be readily understood. The spreader is loaded in the usual manner, the approximate initial outline of the load being indicated by dotted lines in Fig. 1. During the loading the rake, being freely movable in the slots, is in its lowermost position, as indicated, and it serves to temporarily hold the load back out of engagement with the beater.

After loading and after the spreader has been transported to the place where distribution of the manure is to take place the beater is connected with the axle and it immediately starts to rotate rapidly, as the load is held out of engagement with it as aforesaid by the rake. At about the same time the movable bottom is set in motion and the load is carried backward toward the beater. As the load moves backward the rake will be shoved upward and backward along the slots to permit the lower stratum of the load to come into contact with the beater. As the rear parts of this stratum are torn off by the beater and the other parts are forced rearward the rake slowly turns, one set of fingers after another coming into engagement with the manure. The fingers are long sharp-pointed rods and are arranged in four rows. As a row of fingers moves downward, it penetrates deeply into the top stratum of the load. The fingers contact with and enter the manure at such an angle that they effectually arrest the advance of the top stratum and prevent the upper part of the load from crowding to the beater. The body is loaded advantageously by piling the material higher at the front, but the action of the rake is to ultimately have the beater supplied with a stratum of approximately uniform depth and a depth considerably less than that of the forward part of the original load. The upper stratum is checked and relatively pushed backward, compelling it to finally advance on lines near the apron.

The fingers, as stated, slowly rotate backward and their points revolve on paths close to the outer circles of rotation of the beater fingers; and this results in a secondary work done by the rake for its fingers, in connection with those of the beater, acting to break up the material that is picked up by the beater and preventing large clots or masses from being thrown upward and backward; they assist in a thorough disintegration. The position of the rake will of course vary from time to time in accordance with the irregularities of the load, but on account of the peculiar angle at which the slots are located the distance between the rake and the beater will remain substantially constant. It will further be seen that not only can the rake as a whole move upward or downward, but that one end can move independently of the other, as indicated in Fig. 3. Of course the upper surface of a load will be very irregular and by my invention I have provided a rake adapted to automatically accommodate itself not only to longitudinal irregularities of the load but also to the transverse irregularities.

I am aware that it has heretofore been proposed to provide a rake device adapted to coöperate with a beater initially in holding the load back and finally in breaking up and shredding the material, and I myself have heretofore proposed to provide a rotatable rake device adapted to be rotated under the influence of the backward moving load. But I believe myself by my present invention to be the first to provide such a rake device movable in fixed guides and controlled solely by the load so as to be entirely free to follow the irregularities thereof.

What I claim is:

1. In a manure spreader, the combination of the beater, the load-carrying apron, the power devices for actuating the beater and the apron, the rotary rake in front of the beater and disconnected from the power devices, and the load-carrying body adapted to support a load of manure which extends to planes above the lower part of the rake, said rake having a shaft of short diameter and elongated sharpened teeth adapted to rotate relatively slowly under the action of the upper stratum of the load and retard said stratum while permitting the lower part to advance toward the beater, and said rake being freely mounted at its ends in guides on the body, each of said ends being free to rise and fall independently of the other and independently of the power mechanism.

2. In a manure spreader, the combination of the beater, the load-carrying apron, power devices for actuating the beater and the apron, the loosely mounted rotary rake in front of the beater, and the load-carrying body adapted to support a load of manure which extends to planes above the lower part of the rake, said rake having elongated sharpened teeth adapted to rotate relatively slowly under the action of the upper part of the load and penetrate it on forward and downward inclined lines to retard said stratum while permitting the lower part of the load to advance toward the beater and said rake being freely mounted at its ends in guides arranged on lines tangential to circles around the beater, each of said ends being free to rise and fall independently of the other and of the power mechanism, and springs normally drawing the ends of the beater to the lower ends of the guides.

In testimony whereof, I affix my signature, in presence of two witnesses.

FRANK RAISBECK.

Witnesses:
 THEOPHILUS BROWN,
 JOSEPH H. BROWNING.